United States Patent
Shlyakhovsky

[11] Patent Number: 6,036,990
[45] Date of Patent: Mar. 14, 2000

[54] DEVICE AND METHOD FOR AUTOMATED KNOTTING OF DOUGH STRANDS

[75] Inventor: Michael Shlyakhovsky, Bet-Shemesh, Israel

[73] Assignee: Bread T. T. Ltd., Kiryat Gat, Israel

[21] Appl. No.: 09/297,861

[22] PCT Filed: Nov. 13, 1997

[86] PCT No.: PCT/IL97/00369

§ 371 Date: May 10, 1999

§ 102(e) Date: May 10, 1999

[87] PCT Pub. No.: WO98/20741

PCT Pub. Date: May 22, 1998

[30] Foreign Application Priority Data

Nov. 14, 1996 [IL] Israel ......................................... 119612

[51] Int. Cl.[7] .................. A21C 3/00; A21D 6/00
[52] U.S. Cl. .......................... 426/500; 425/319; 425/323; 425/334; 426/499
[58] Field of Search .................................. 426/500, 499, 426/512, 517; 425/319, 323, 334

[56] References Cited

U.S. PATENT DOCUMENTS

| | | | |
|---|---|---|---|
| 2,114,951 | 4/1938 | Young et al. | 425/323 |
| 2,629,340 | 2/1953 | Allen et al. | 425/323 |
| 4,288,463 | 9/1981 | Groff et al. | 426/500 |
| 5,492,708 | 2/1996 | Hemmerichn | 426/500 |
| 5,556,660 | 9/1996 | Schutz | 426/500 |
| 5,702,732 | 12/1997 | Piller | 426/500 |

*Primary Examiner*—George C. Yeung
*Attorney, Agent, or Firm*—Mark M. Friedman

[57] ABSTRACT

A method for automated forming of a knot in a strand of dough includes providing a spacer element having an outer surface and an integral channel, and forming around this outer surface a loop from a first part of the strand. A second part of the strand is then positioned such that at least an end of the strand extends into the channel, crossing a virtual plane passing through the loop, and the spacer element is withdrawn from the loop of dough such that the strand remains in the form of a knot. A device for implementing the method typically includes a work surface with at least one aperture, a mechanical manipulator for gripping and manipulating the dough, and a displacer element aligned with the aperture and movable in a direction roughly perpendicular to the working surface to displace an end of the strand through the plane of the loop of dough to form a knot.

17 Claims, 16 Drawing Sheets

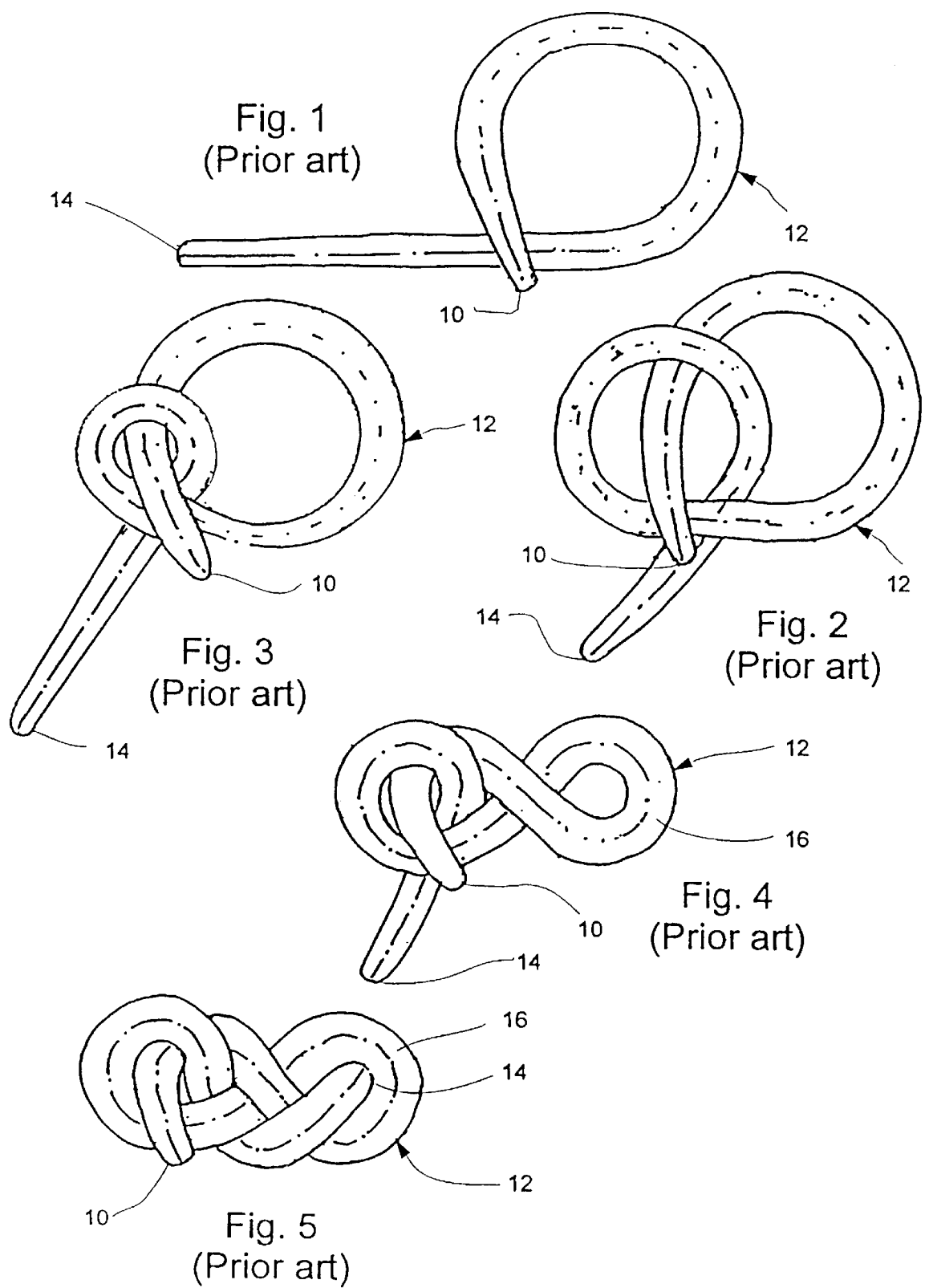

DEVICE AND METHOD FOR AUTOMATED KNOTTING OF DOUGH STRANDS

FIELD AND BACKGROUND OF THE INVENTION

The present invention relates to the shaping of dough for producing bread and other baked goods and, in particular, it concerns devices and methods for automated knotting of dough strands to form knotted or plaited shapes.

It is known to produce various types of bread rolls and loaves in which a roll or "strand" of dough is knotted. Examples include a generally round shape formed from making a simple single knot in a strand of dough (see FIG. 22), and a more complex figure-of-eight shape (see FIG. 19). Such shapes are particularly important for producing intermediate size rolls, as well as for full-size loaves for specific markets such as the traditionally plaited "halla" loaves.

Despite the very high degree of mechanization in the baking industry, the plaiting or knotting of dough strands remains today an exclusively manual procedure. Some of the reasons for the lack of mechanization in this field will be understood from the following description of the conventional method for plaiting a figure-of-eight roll (FIGS. 1–5).

The existing procedure is divided into several steps, the first of which is bending of the right-side end 10 of a strand 12 to juxtapose it with and stick it to a straight section of the strand as shown in FIG. 1. The left-side end 14 of the strand is then passed through the loop so formed in such a manner that the left-side end 14 passes first above and then under the strand as indicated in FIG. 2. The second loop thus formed is tightened as shown in FIG. 3, and the first loop is twisted through 180° to the left as indicated in FIG. 4. The left-side end 14 is pushed through the loop 16 formed by twisting as shown in FIG. 5, the left-side end being directed first above and then under the strand. This completes the plaiting procedure.

The transitions described above require operations such as: pushing of the left-side end 14 under the strand (FIG. 2) which necessitates a change of grip on the end; tightening of the left-side end 14 (FIG. 3) which causes friction of the dough strand sections and adhering thereof; and twisting of the first loop through 180 ° (FIG. 4), etc. These operations make the development of reliable automatic machinery very difficult.

There is therefore a need for a commercially viable device and method for automated production of knotted or plaited dough structures.

SUMMARY OF THE INVENTION

The present invention is a device and method for automated knotting of dough strands to form knotted or plaited shapes.

According to the teachings of the present invention there is provided, a device for forming a knot in a strand of dough comprising: (a) a work surface for receiving the strand of dough, the work surface featuring at least one aperture; (b) a mechanical manipulator positioned over the work surface and configured for gripping and manipulating a first part of the strand of dough so as to form a loop of dough having a central opening associated with the aperture, the manipulator also being configured to deploy a second part of the strand in overlapping relation to the aperture; and (b) a displacer element aligned within the aperture and moveable in a direction substantially perpendicular to the work surface, the displacer element being configured to displace the second part of the strand through the plane of the loop of dough, thereby forming a knot.

According to a further feature of the present invention, there is also provided a spacer element associated with the aperture, the spacer element being configured to provide an outer surface around which the loop of dough is formed, thereby delimiting the central opening.

According to a further feature of the present invention, a vertical channel passes through the spacer element, the vertical channel being configured to accommodate the second part of the strand of dough.

According to a further feature of the present invention, the spacer element has a lateral opening contiguous with, and extending along the length of, the vertical channel.

According to a further feature of the present invention, the spacer element is displaceable through the aperture between a projecting position in which the spacer element projects with the outer surface disposed above the work surface, and a withdrawn position in which the spacer element lies substantially beneath the work surface to facilitate removal of the knotted dough.

According to a further feature of the present invention, the spacer element is further displaceable to an elevated position above and removed from the work surface, thereby lifting the loop of dough away from the work surface such that the second part of the strand may be positioned in overlapping relation to the aperture below the loop of dough.

According to a further feature of the present invention, the work surface features a second aperture displaced from the first aperture, the device further comprising a second spacer element associated with the second aperture, the second spacer element being configured to provide an outer surface around which a second loop of dough may be formed.

According to a further feature of the present invention, there is also provided a retractable pin mounted retractably in relation to the work surface such that it assumes a projecting position in which it projects upwards above the work surface for retaining a portion of the strand of dough pierced thereby, and such that it can be retracted to a withdrawn position for releasing the portion of the strand of dough.

According to a further feature of the present invention, there is also provided a retractable post mounted retractably in relation to the work surface such that it assumes a projecting position in which it projects above the work surface for preventing sliding of a portion of the strand of dough adjacent thereto, and such that it can be retracted to a withdrawn position for facilitating removal of the knotted dough.

According to a further feature of the present invention, there is also provided the displacer element is formed as a hook element for drawing an end of the strand of dough through the loop of dough.

According to a further feature of the present invention, there is also provided an automated system for forming knots in strands of dough comprising a rotating table having a plurality of dough knotting stations, each of the stations being provided with a device as described.

There is also provided according to the teachings of the present invention, a method for automated forming of a knot in a strand of dough, the method comprising: (a) providing a spacer element having an outer surface and an internal channel; (b) forming a loop from a first part of the strand around the outer surface; (c) positioning a second part of the strand such that at least an end of the strand extends into the channel, crossing a virtual plane passing through the loop; and (d) withdrawing the spacer element from the loop of dough such that the strand remains in the form of a knot.

According to a further feature of the present invention, the spacer element is displaceably mounted in an aperture of a work surface, the withdrawing being achieved by lowering the spacer element through the aperture to a position substantially below the work surface.

According to a further feature of the present invention, the method further comprises: (a) providing a second spacer element having an outer surface and an internal channel; (b) forming a second loop from a third part of the strand around the outer surface of the second spacer element; (c) positioning a fourth part of the strand such that at least an end of the strand extends into the channel, crossing a virtual plane passing through the loop; and (d) withdrawing the second spacer element from the second loop of dough such that the strand remains in the form of a second knot.

According to a further feature of the present invention, the steps of positioning are performed such that the second part of the strand is positioned to extend downwards while the fourth part of the strand is positioned to extend upwards.

According to a further feature of the present invention, the internal channel of each of the spacer elements is a vertical channel, open so as to interrupt the outer surface and extending along the entirety of a vertical dimension of the spacer element, the spacer elements being displaceably mounted in spaced apart apertures of a work surface, the method further comprising a step of raising both of the spacer elements to facilitate positioning of the fourth part of the strand from below the loop of dough formed from the third part of the strand.

According to a further feature of the present invention, the steps of withdrawing the spacer elements are achieved by lowering the spacer elements through the apertures to positions substantially below the work surface.

BRIEF DESCRIPTION OF THE DRAWINGS

The invention is herein described, by way of example only, with reference to the accompanying drawings, wherein:

FIGS. 1–5 are schematic plan views of the stages of the conventional technique for producing a figure-of-eight roll;

DESCRIPTION OF THE PREFERRED EMBODIMENTS

Figure 6:
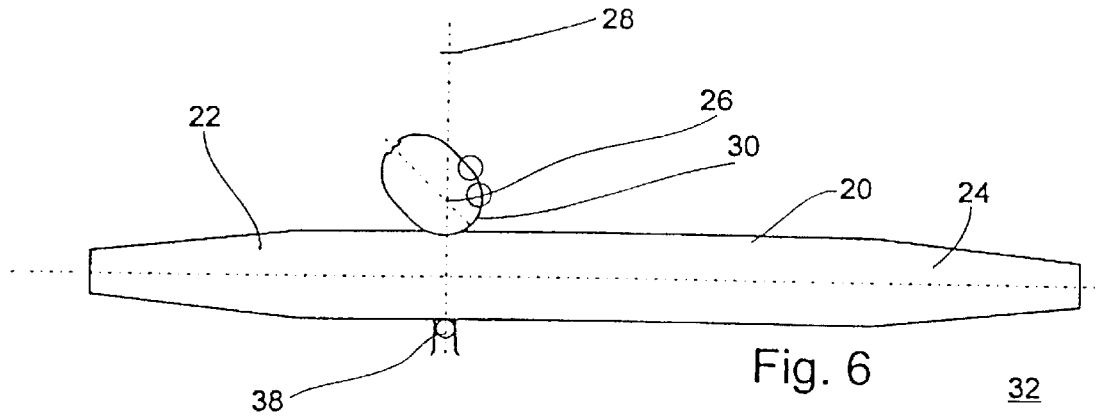
FIGS. 6–12 are schematic plan views of the stages of a technique according to a first embodiment of the present invention for producing a figure-of-eight roll.

The present invention is a device and method for automated knotting of dough strands to form knotted or plaited shapes.

The principles and operation of devices and methods according to the present invention may be better understood with reference to the drawings and the accompanying description.

Referring now to the drawings, FIGS. 6–12 illustrate a first embodiment of a device, generally designated 18, and a corresponding technique, for knotting a strand of dough 20 according to the teachings of the present invention.

Generally speaking, the devices of the present invention typically include at least one spacer element having an outer surface and an internal channel. A loop is formed from a first part of the strand around the outer surface of the spacer element, and a second part of the strand is positioned such that it extends into the channel, crossing a virtual plane passing through the loop. The spacer element is then withdrawn from the loop of dough, leaving the strand in the form of a knot.

For the sake of clarity, it should be pointed out that, due to the thickness of the strand of dough, one end of the loop of dough lies above the other so that the loop does not lie flat on an underlying surface. The aforementioned "virtual plane passing through the loop" is preferably defined as a plane across which a cross-section through the loop includes the central opening surrounded, or substantially surrounded, by dough.

The strands of dough used in the devices and methods of the present invention are typically produced by rolling thin rolled-out dough sheets. Such strands can be produced by conventional automated technology to provide dough strands with good flavor and long shelf life.

Figure 7:
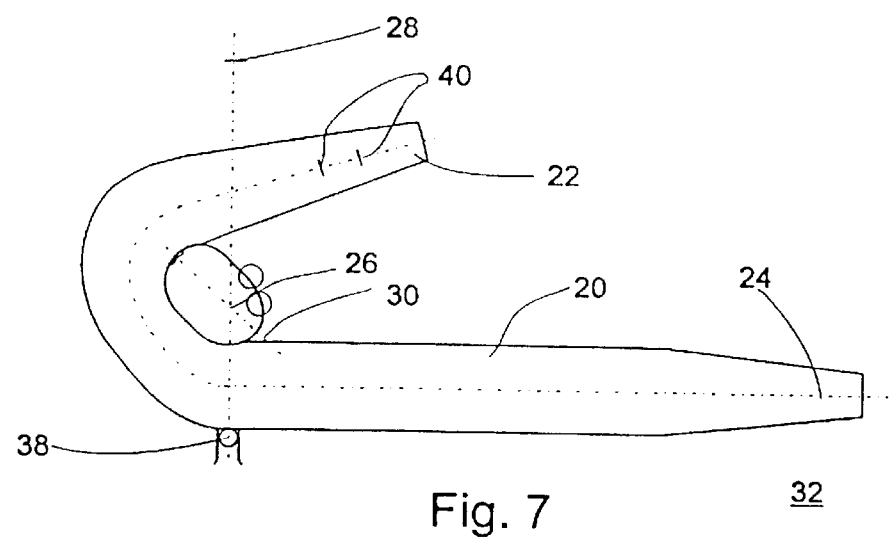
Figure 8:
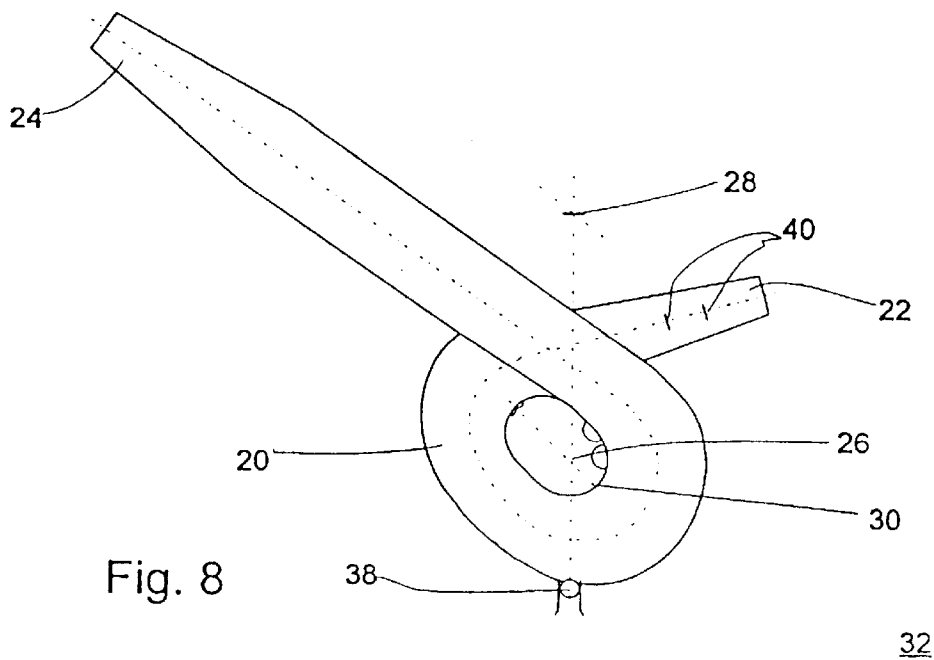
Figure 9:
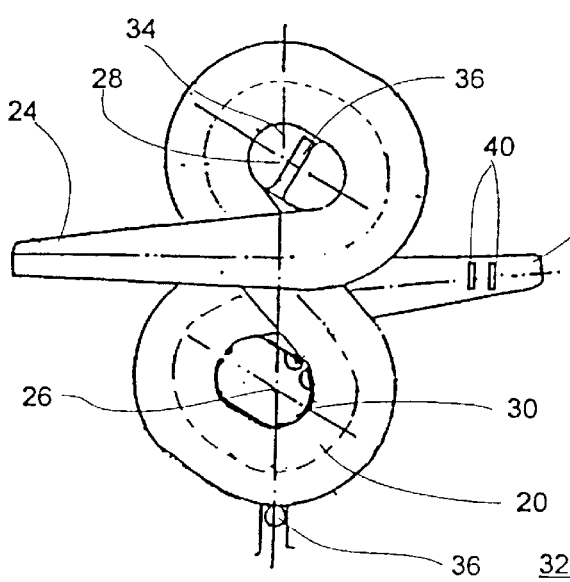
Figure 10:
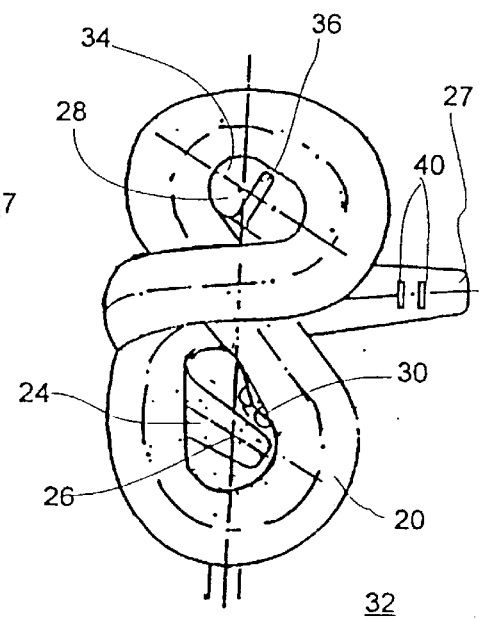
Figure 11:
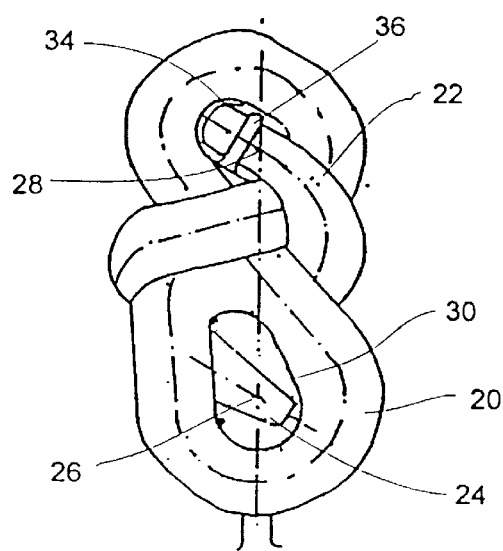
Figure 12:
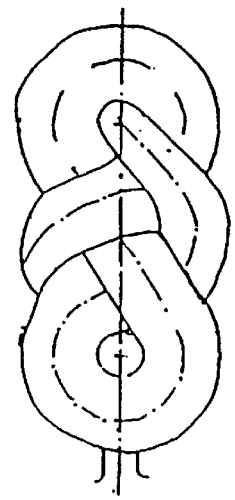

Turning now to the details of the first embodiment, strand 20 is placed on a horizontal work surface 32 so that the left-side end 22 of the strand projects beyond the left side of the first midpoint of plaiting 26 by about one-third of the starting length of the strand as shown in FIG. 6. Then the first spacer element with an expanding mandrel 30 is raised from the midpoint of plaiting 26 at a height equal to the diameter of strand 20 above the horizontal work surface. Strand 20 is then pressed to mandrel 30 by clamp 38, with the left-side end 22 being twisted around the mandrel as shown in FIG. 7 so that the left-side end emerges in the centre between midpoints 26 and 28. Said end 22 is set on fixing rod 40 that moves vertically together with the mandrel. Then the right-side end is lifted up at a height exceeding the diameter of strand 20 and is twisted around the mandrel in a manner permitting second spacer element 34 with a hook 36 on its top to move upward from the midpoint of plaiting 28 as shown in FIG. 8. The spacer element 34 is moved upward at a distance equal to the diameter of strand 20 according to FIG. 9, the strand being twisted around the spacer element so that end 24 emerges in the centre between midpoints 26 and 28. Then expanding mandrel 30 together with a section of strand 20 twisted therearound is lifted up above work surface 32 at a height exceeding the diameter of the strand, and end 24 is led behind the first midpoint of plaiting 26 as indicated in FIG. 10. The mandrel 30 is to be unclamped, whereafter the end 24 of strand 20 is introduced into hollow mandrel 30. At this point end 24 is supported from below, with the unclamped mandrel being pulled down until the top end thereof is below horizontal work surface 32, whereafter end 24 is left free from support from below. Then first end 22 is lifted up and led under hook 36 of second spacer element 34 according to FIG. 11, and the spacer element is lowered until hook 36 is below the level of work surface 32; in the process of twisting the ends of strand 20 around mandrel 30 and spacer element 34 the strand is being stretched by the total value equal to expanded lengths of the mandrel and spacer element. After the both midpoints of plaiting 26 have been left free from the mandrel and spacer element, strand 20 grows shorter and fills the midpoints of plaiting at the expense of its own properties as is seen in FIG. 12.

Thus, the spacer elements may preferably be raised and lowered independently between three positions relative to the work surface. In a lowered position, they lie generally below the level of the work surface, allowing mechanical removal of a finished dough form. In a first raised position, the outer surfaces of the spacer elements provide a template around which loops of the dough are formed. And in a further elevated position, the spacer elements serve to lift the loops of dough clear of the work surface so that end 24 can be positioned below its loop of dough.

In order to render clearer the graphic presentation of the present invention, the mechanical arm or "manipulator" which implements the various movements of the dough strand has been omitted from the drawings. With the exception of the manipulating tip itself, the remainder of the manipulator structure is essentially similar to the robotic arms well known in a wide range of mechanized systems. A preferred design for a manipulator tip suited for use in any of the embodiments of the present invention will be described below with reference to FIG. 18.

Turning to FIGS. 13–19, a second embodiment of a device, generally designated 44, for automatically forming knots in a strand of dough will now be described. Device 44 is conceptually similar to device 18 described above, differing primarily in the structure of the spacer elements. Specifically, in contrast to the expandable structure of spacer element 30, both spacer elements of device 44 are formed as rigid open-sided elements. The device is also supplemented by two independently movable displacer elements.

Thus device 44 has a work surface 51 for receiving strand of dough 54. Work surface 51 has two- apertures 57 and 58 within which spacer elements 55 and 56 are vertically displaceable. A mechanical manipulator, to be described in more detail with reference to FIG. 18 below, is positioned over the work surface and configured for gripping and manipulating a first part of the strand of dough so as to form a loop of dough having a central opening associated with one of the apertures, and a second part of the strand in overlapping relation to the aperture. A displacer element 59, 60, aligned within each aperture and moveable in a direction substantially perpendicular to the work surface, is configured to displace the second part of the strand through the plane of the loop of dough, thereby forming a knot.

The phrase "overlapping relation" is used herein to refer to a position in which a part of the strand of dough lies in vertically alignment with part of an aperture. It should be noted that, as will be clear from the description and figures, the location of the overlapping dough may however be vertically removed from the level of the aperture.

Each spacer element 55, 56 is configured to provide an outer surface around which a loop of dough can be formed. This outer surface thus serves to delimit the central opening of the loop. It should be noted that this outer surface need not necessarily be continuous. Thus, for example, the required effect of delimiting the central opening of the loop could be achieved by a framework of parallel vertical retractable rods. Typically, however, the outer surface will be continuous except for the lateral opening to be described below. The periphery of apertures 57 and 58 typically follows quite closely the contour of the outer surfaces.

Spacer elements 55 and 56 are preferably formed with a vertical channel configured to accommodate the second part of the strand of dough. In his embodiment, the spacer elements are also formed with a lateral opening contiguous with, and extending along the length of, the vertical channel. The resulting shape is an elongated open "C-shaped" or "U-shaped" element as shown.

Displacer elements 59 and 60 are of two types. Element 59 is essentially a shaped actuator rod configured for pressing an end of the dough strand upwards. Element 60, on the other hand, is formed as a hook for drawing an end of the dough strand downwards through a dough loop. The form of the hook is preferably a simple L-shape as shown, although any structure forced to engage the dough strand and urge it downwards may be used. Optionally, a roller or other friction-reducing structure (not shown) may be provided on the dough contacting surface of the hook.

By positioning an end of the dough overlying the vertical channel of spacer element 56 with displacer element 60 in its raised position and then drawing element 60 downwards, the end of the dough strand is drawn down into the vertical channel.

As mentioned earlier, the vertical channel of the spacer elements is preferably open laterally. This allows the action of the displacer elements to press the ends of the dough strand directly against the adjacent dough of the loop, thereby causing them to stick together so that the end of the strand remains in place.

Another preferred feature of device 44 is provision of a retractable pin 63 mounted retractably in relation to work surface 51 such that it assumes a projecting position (FIG. 13), projecting upwards from work surface 51, for retaining a portion of the strand of dough pierced thereby, and retractable to a withdrawn position (FIG. 17) for releasing the strand of dough.

Figure 17:
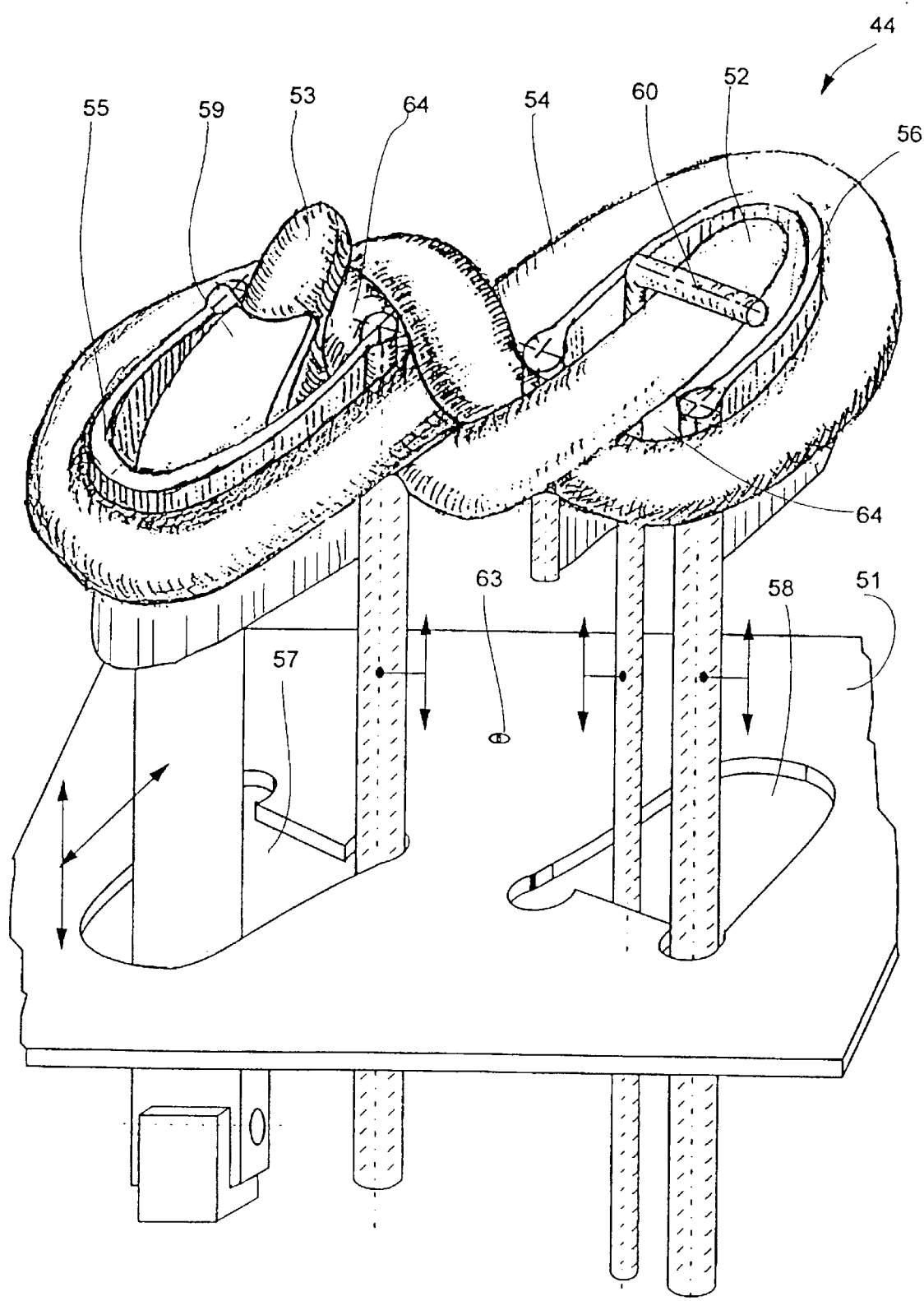

Each of the spacer elements 55 and 56, displacer elements 59 and 60, and retractable pin 63 are preferably mounted on independently controlled actuator rods, best seen in FIG. 17, which permit vertical adjustment of the positions of these elements.

The spacer elements, in particular, are preferably displaceable between three different positions, as described in the context of the first embodiment. In a lowered position (spacer element 56 in FIGS. 13–15), the entirety of the spacer element lies substantially beneath the work surface. The term "substantially" is used here to indicate that the upper edge of the spacer element may be in any position from slightly above to well below work surface 51 without interfering with the function of this position. This position facilitates unobstructed manipulation of dough across the work surface, as well as permitting removal of the finished knotted dough. In a projecting position (FIG. 16), the spacer elements project so that the outer surface is disposed above the work surface. This is the normal operative position for winding of a loop of dough around the spacer element. Finally, in an elevated position (FIG. 17), above and removed from work surface 51, the spacer elements serve to lift the loops of dough away from the work surface such that the second part of the strand may be positioned in overlapping relation to the aperture below the loop of dough.

Figure 18:
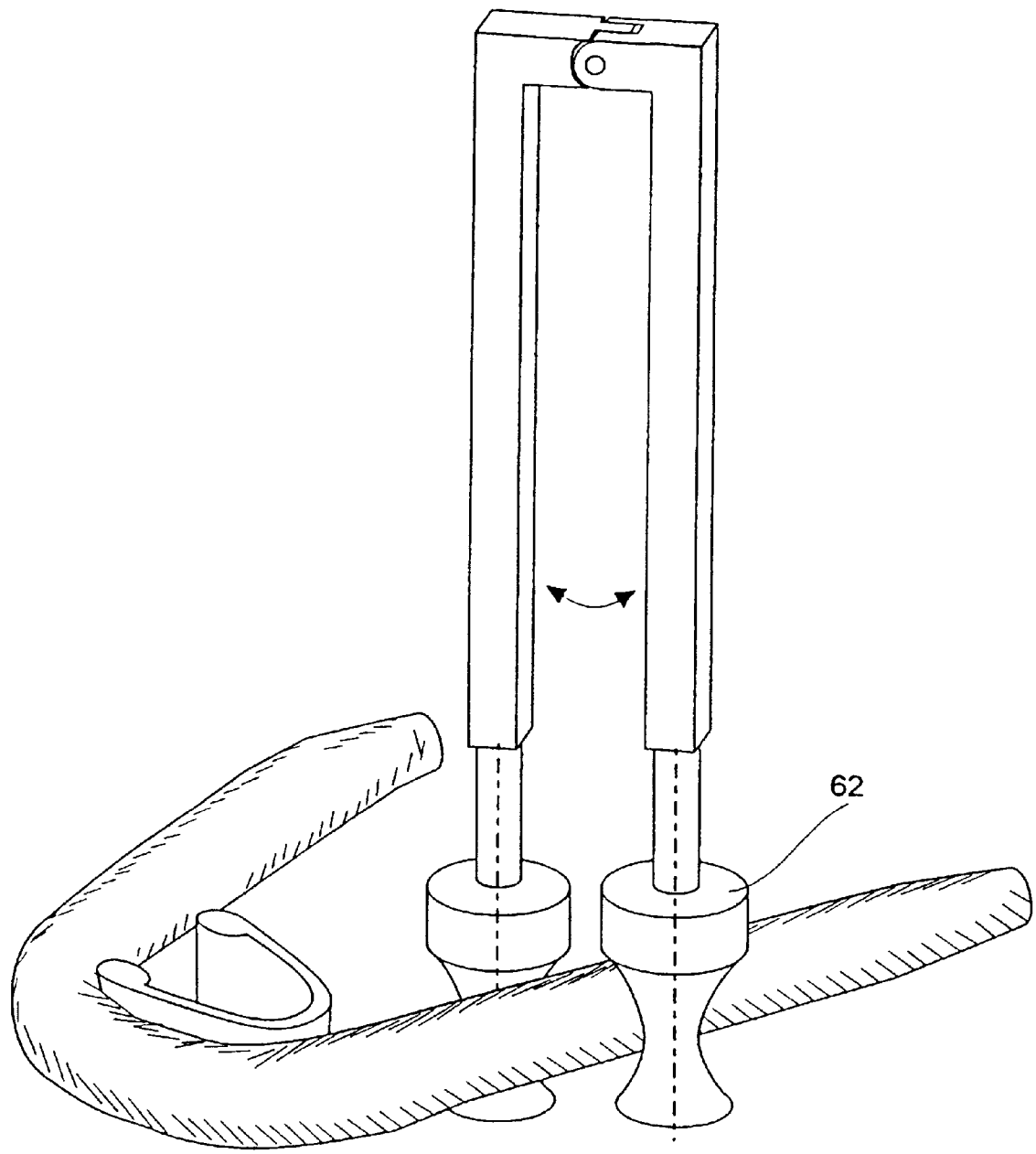
FIG. 18 is a schematic isometric view of a dough strand manipulator for use in the embodiments of FIGS. 6–12 and 13–17.
Figure 19:
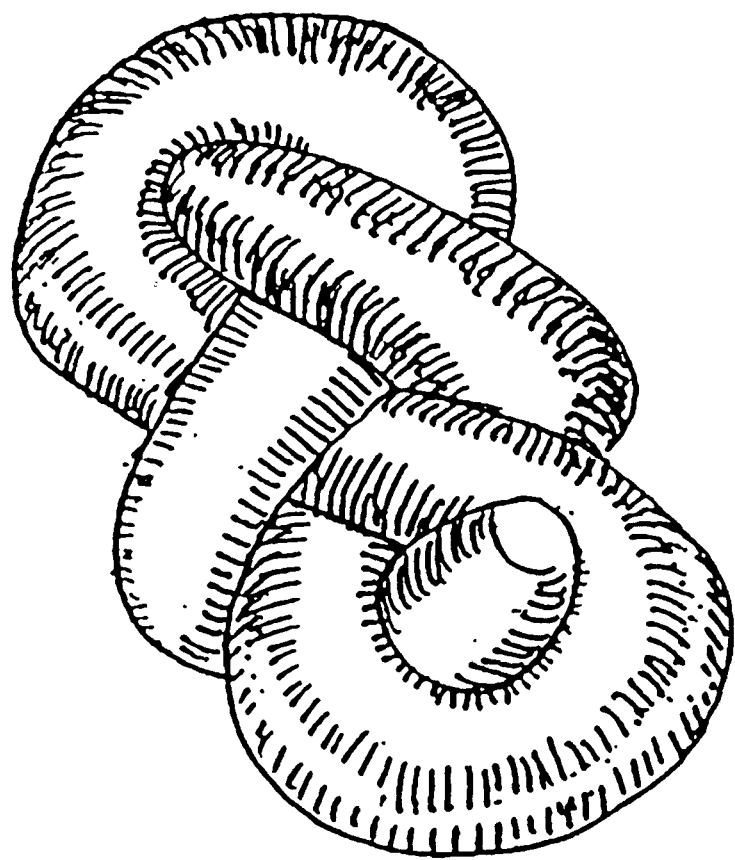
FIG. 19 is a schematic isometric view of the figure-of-eight roll produced by the embodiments of FIGS. 6–12 and 13–17.

As mentioned earlier, manipulation of dough strand 54 is performed by a manipulator which is effectively a robotic arm provided with a specially designed manipulator tip. One preferred example of a manipulator tip structure is shown in FIG. 18. The tip 62 features a clamp, the jaws of which are formed as rollers with concave surfaces. The ends of the dough strand are sequentially caught between the jaws of tip 62 and manipulated. By either locking or freeing rotation of the jaw rollers, tip 62 can either allow axial movement of the strand through the jaws or be made to clamp the strand firmly.

Figure 13:
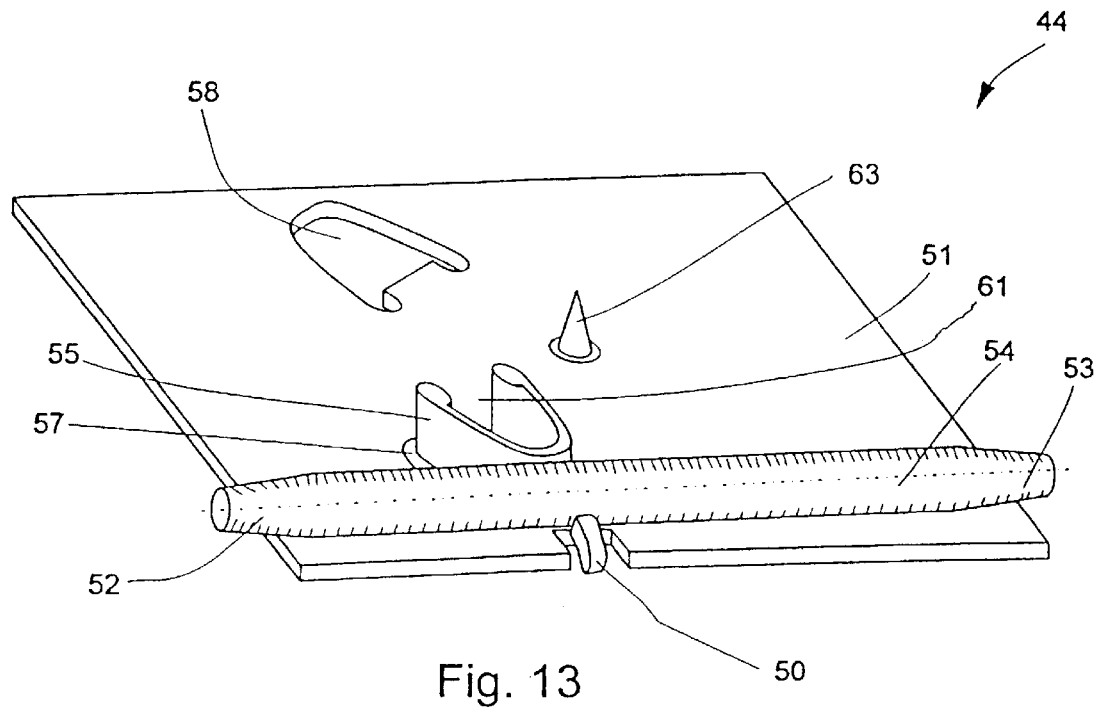
FIGS. 13–17 are schematic isometric views of the stages of operation of a second embodiment of the present invention for producing a figure-of-eight roll.

Turning now to the operation of device 44 and the corresponding method, the sequence of plaiting is as follows. The dough strand 54 for figure-of-eight type rolls is loaded on the horizontal work surface 51 so that the left end 52 of the strand 54 extends about one third of the initial length of the strand 54 from the spacer element 55 center (FIG. 13). The strand 54 is held in this position by a clamp 50 which presses it against spacer element 55, the latter being in its raised position in which it projects from the work surface 51 through a height approximately equal to the initial diameter of dough strand 54.

Figure 14:
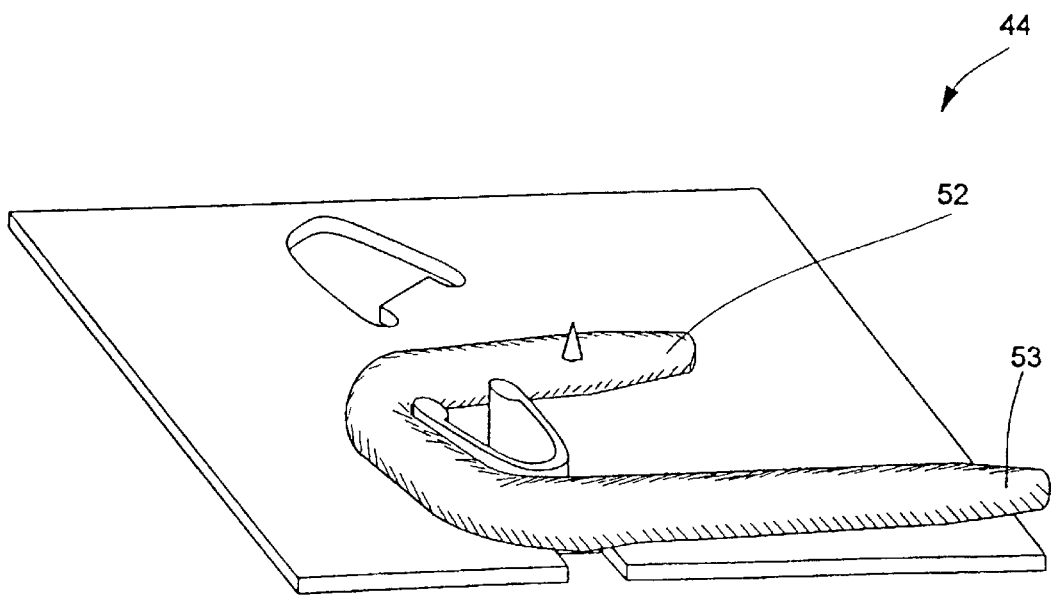

The tip 62 of the manipulator (FIG. 18) grasps the end 52 of strand 54 and winds it around spacer element 55, simultaneously stretching it and turning the tip 62 clockwise, so that the end 52 is placed approximately in the middle between apertures 57 and 58. The end 52 of the strand 54 is clamped on to vertical retainer pin 63 (FIG. 14).

Figure 15:
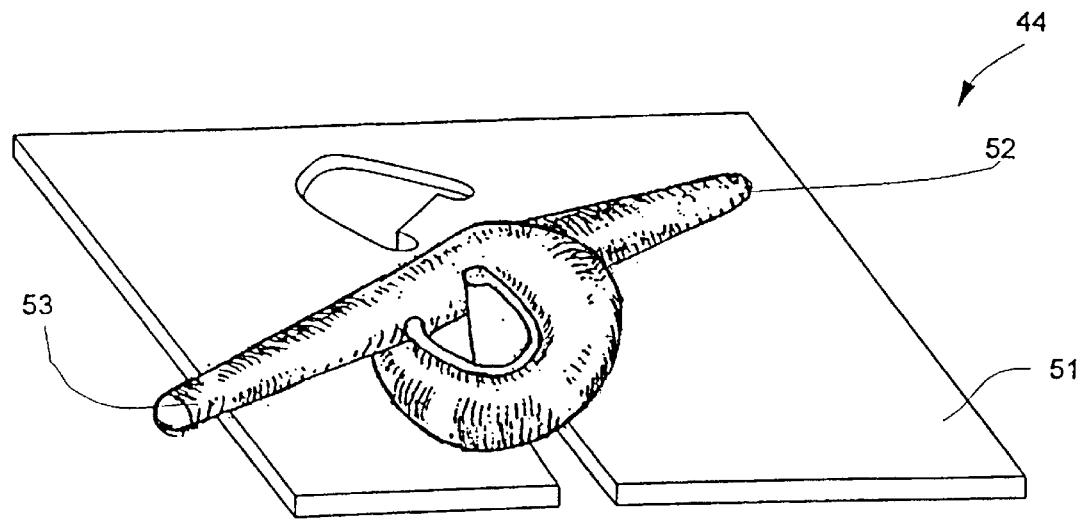
Figure 16:
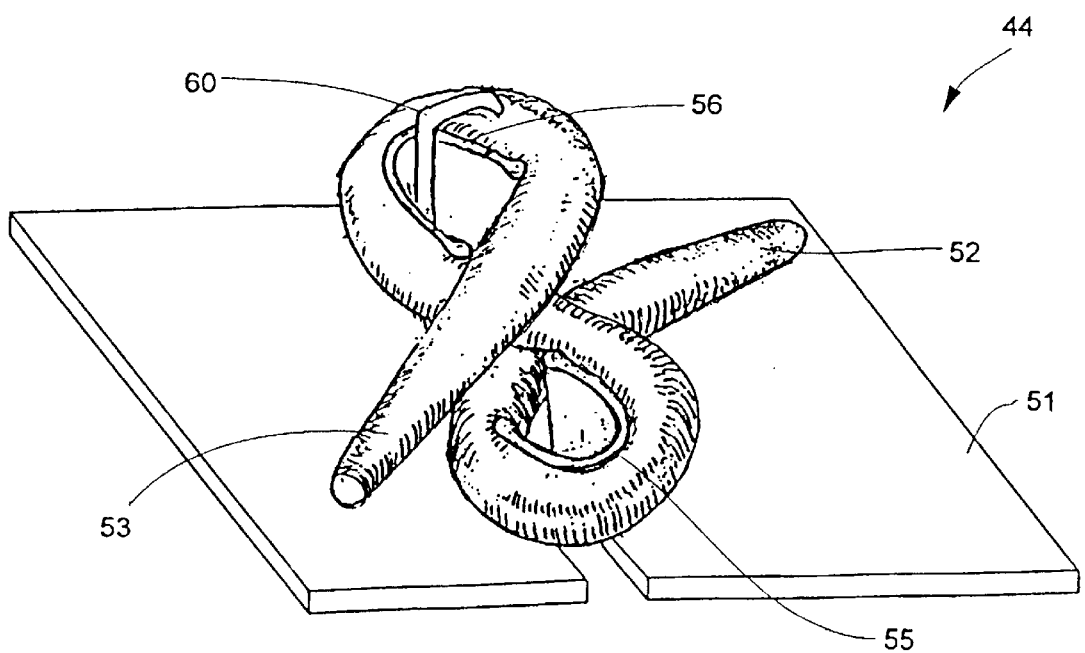

The second end 53 of the strand 54 is then grasped by tip 62 and wound counterclockwise around the spacer element 55 to a position in which the strand 54 body does not obstruct raising of second spacer element 56 through aperture 58 (FIG. 15). Then, spacer element 56 is raised and the manipulator winds the end 53 of the strand 54 around the spacer element 56 until the end 53 is in the middle between the plaiting centers (FIG. 16).

Next, both spacer elements 55 and 56 and the retainer pin 63 are raised to their elevated positions above work surface 51 and the end 53 is brought under the lower edge of spacer element 55 and aligned with its lateral opening 64. The end 53 is pushed into the spacer element 55 by an upward movement of displacer element 59 (FIG. 17).

The spacer elements 55 and 56 are then lowered until the strand 54 touches the work surface 51. End 52 is then grasped, pulled out towards the lateral opening 64 of spacer element 56 and is pushed into the spacer element 56 by lowering displacer element 60. Finally, the both spacer elements and the retainer pin are lowered through the work surface apertures, thus freeing the finished figure-of-eight dough structure (FIG. 19) from the spacer elements.

The present invention has been described thus far in the context of devices and methods for producing what has been called a figure-of-eight shaped dough. However, it should be understood that the same principles may be applied both with fewer or more numerous plaiting centers. By way of illustration, two further examples which employ a single plaiting center will now be described with reference to FIGS. 20–27.

Figure 20:
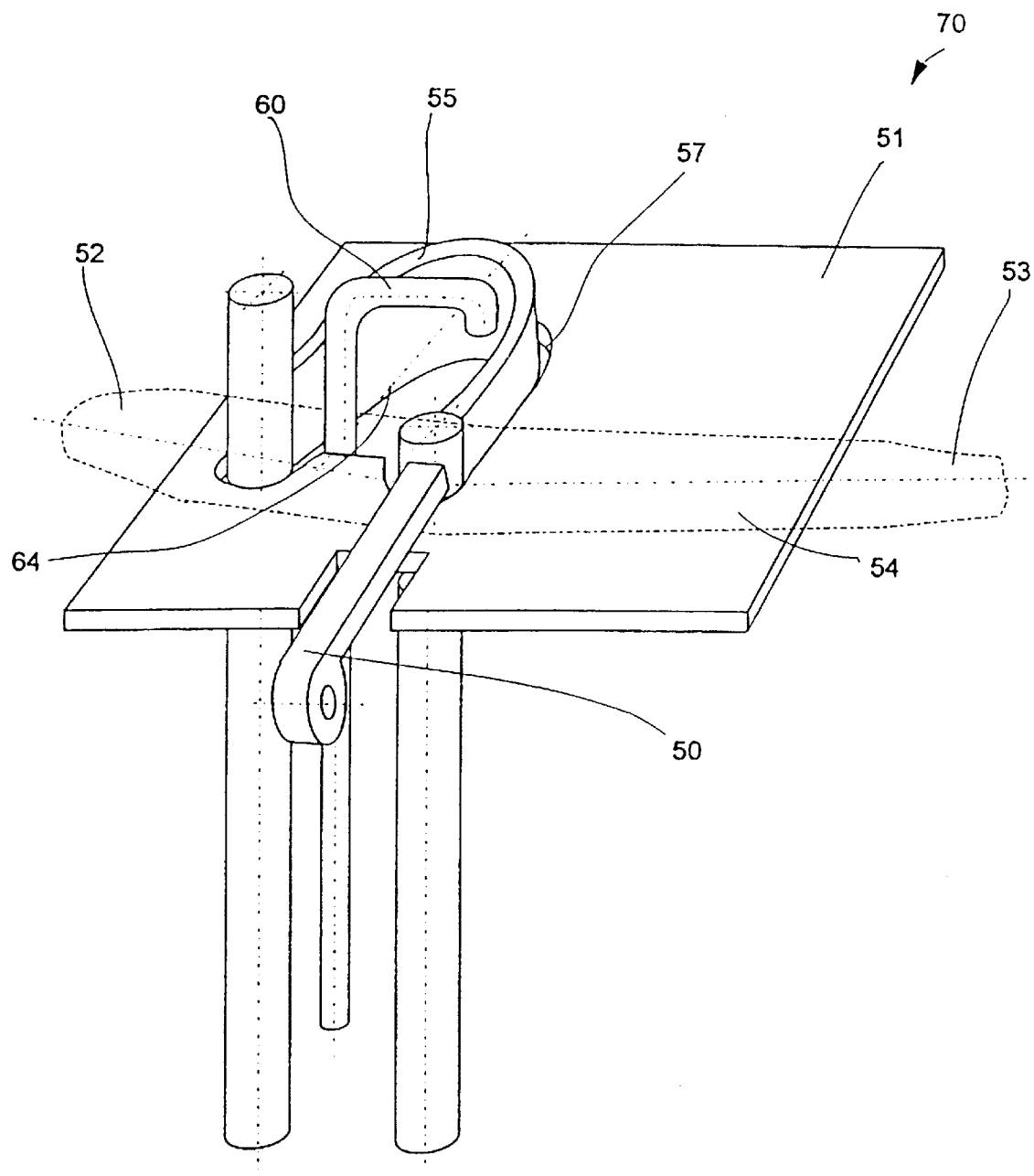
FIGS. 20 and 21 are schematic isometric views of the stages of operation of a third embodiment of the present invention for producing a simple knot roll.
Figure 21:
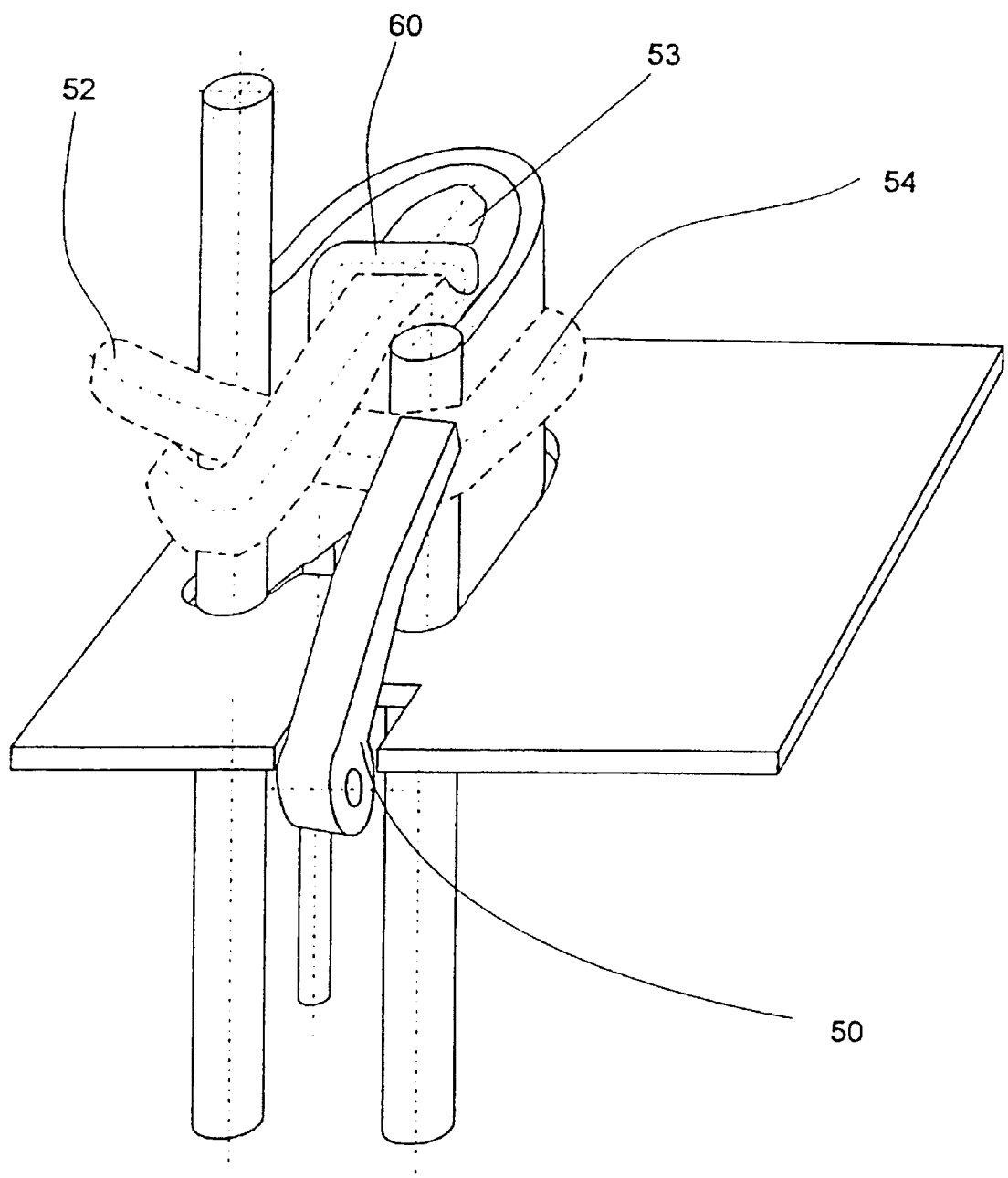
Figure 22:
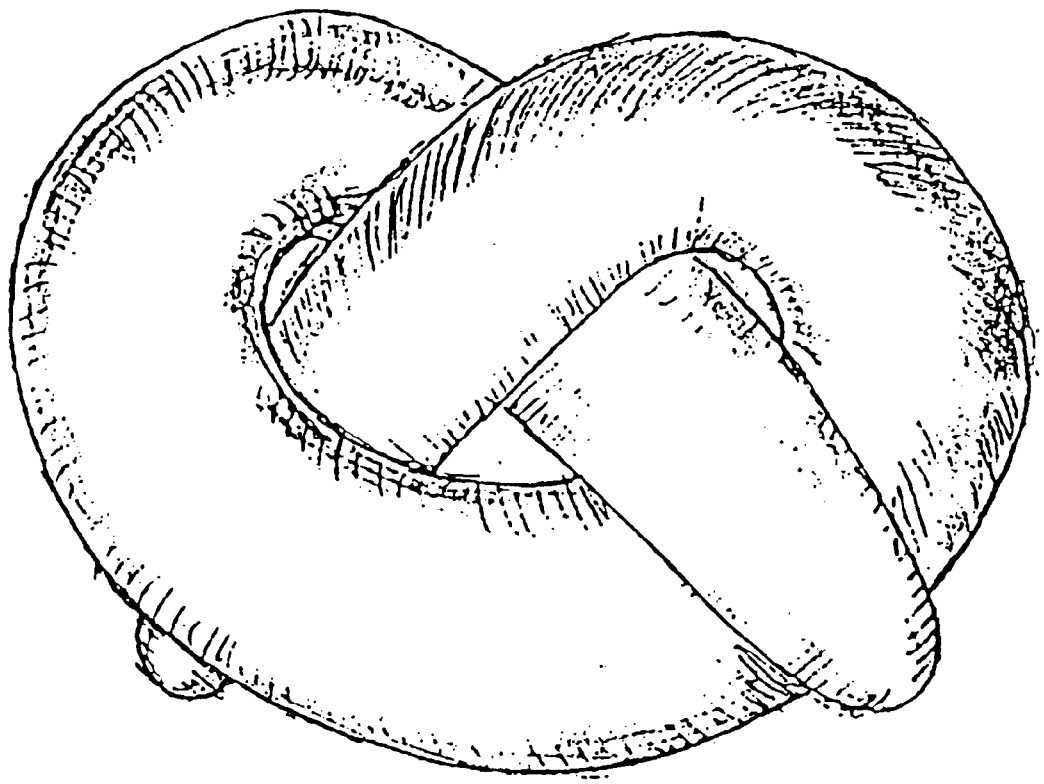
FIG. 22 is a schematic isometric view of the roll produced by the embodiment of FIGS. 20 and 21.

FIGS. 20 and 21 illustrate a preferred implementation of a device, generally designated 70, for automatically forming a single knot dough structure as illustrated in FIG. 22 which is suitable for producing the common style of round bread roll. Device 70 is generally equivalent to one half of device 44 described above, and equivalent elements are designated similarly.

In use, the dough strand is loaded onto work surface 51 in such a manner that the end 52 of the strand 54 extends about two strand diameters from the left end of the spacer element 55. The strand is pressed by clamp 50 against the right side of the spacer element 55. The spacer element is lifted along with the strand 54 and displacer element 60. The end 53 of the strand 54 is wound around the spacer element 55 by counterclockwise movement and rotation of the tip 62 of the manipulator. In the process of manipulator movement with the rollers of tip 62 free to rotate, end 53 is drawn below end 52, and then lifted back over strand 54 to reach a position below displacer element 60 as shown in FIG. 21. Displacer element 60 is then lowered, and end 53 is released. When spacer element 55 is subsequently lowered below the level of the work surface 51, a knotted roll (FIG. 22) remains on the work surface.

Figure 25:
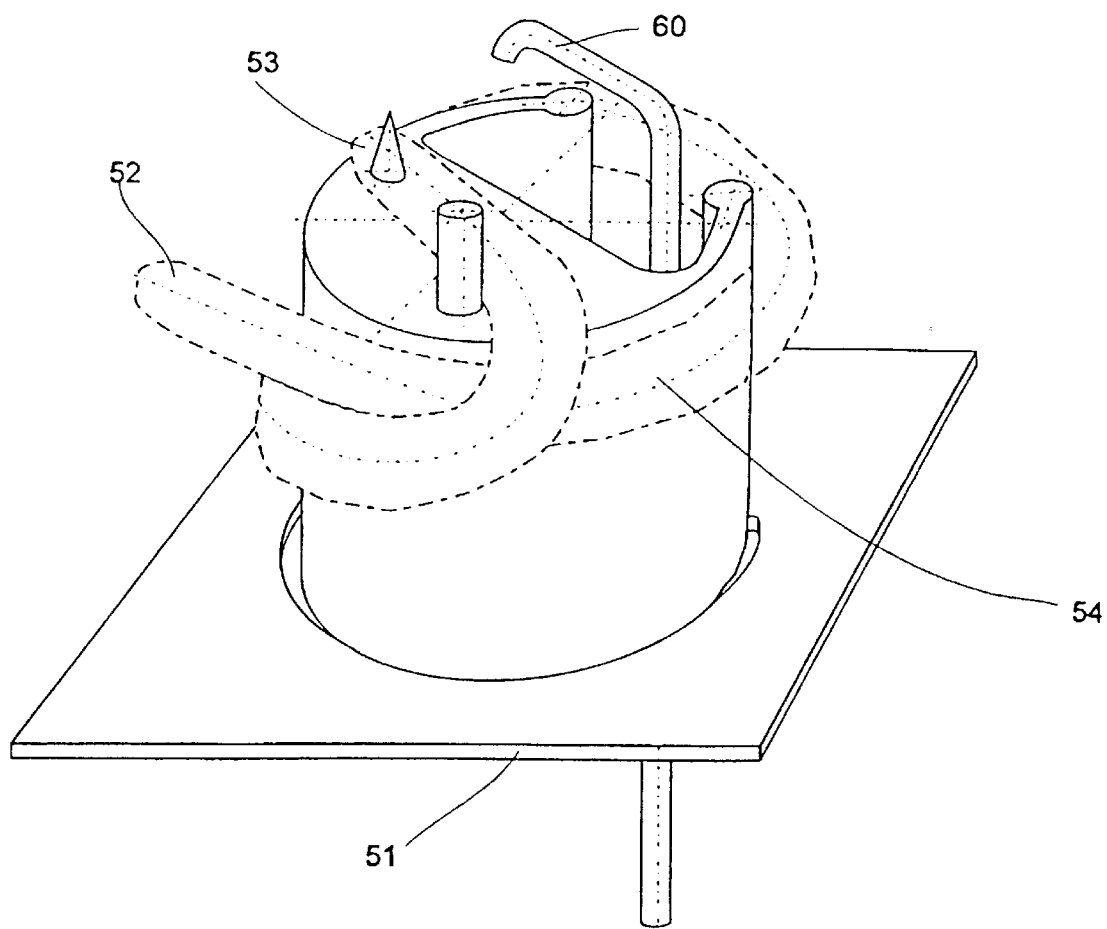
Figure 26:
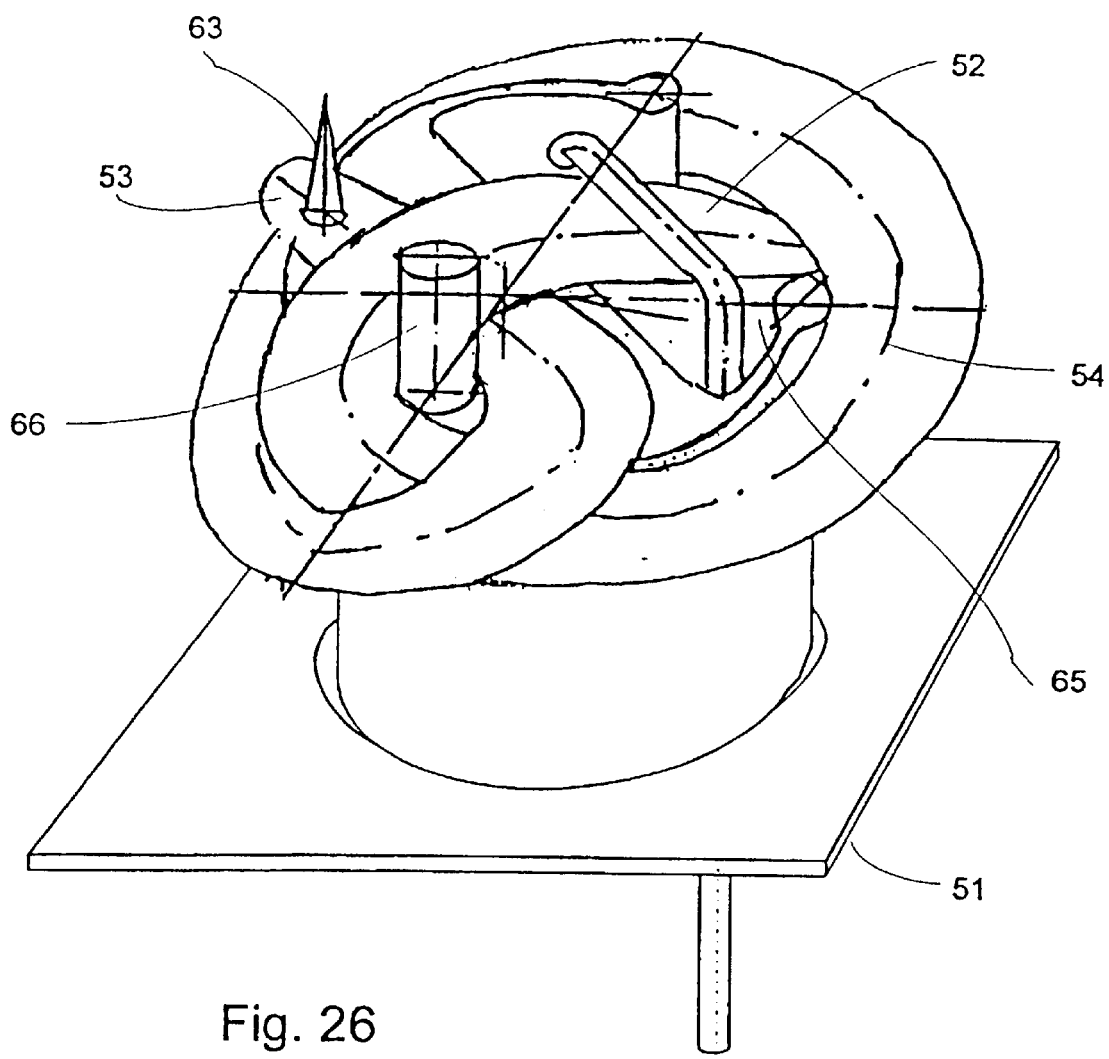
Figure 27:
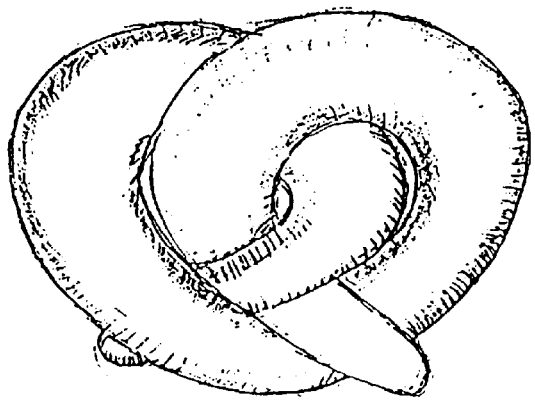
FIG. 27 is a schematic isometric view of the roll produced by the embodiment of FIGS. 23–26.

FIGS. 23–26 illustrate a preferred implementation of a further device, generally designated 72, for automatically forming a more complex knotted dough structure as illustrated in FIG. 27. Device 72 is also generally equivalent to one half of device 44 described above, and equivalent elements are again designated similarly. In this case, however, the vertical channel of spacer element 55 is reduced to a relatively small fraction, typically less than half, of its cross-sectional area, and retractable pin 63, as well as an additional retractable post 66, are located on the upper surface of spacer element 55.

In its projecting position, retractable post 66 projects above spacer element 55, and hence also above the work surface, for preventing sliding of a portion of the strand of dough adjacent thereto. Retraction to its withdrawn position facilitates removal of the knotted dough. In this context, it should be noted that both pin 63 and post 66 are referred to as "mounted relative to", and "projecting above", the work surface. These phrases are used herein in the description and claims to refer both to items directly mounting in the work surface and to items mounted on a spacer element which are thereby indirectly mounted relative to the work surface.

Figure 23:
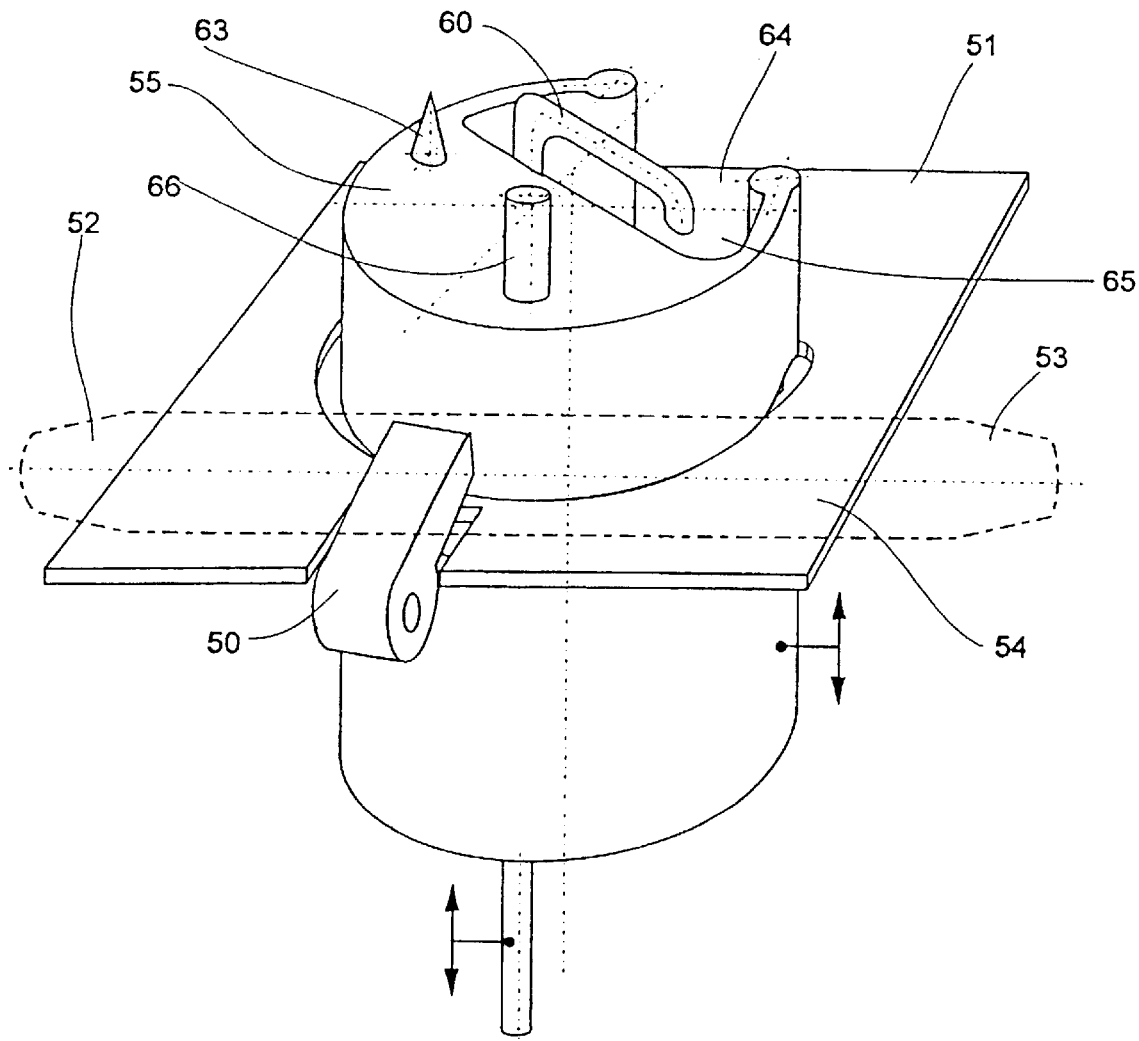
FIGS. 23–26 are schematic isometric views of the stages of operation of a fourth embodiment of the present invention for producing an additional shape of plaited roll.
Figure 24:
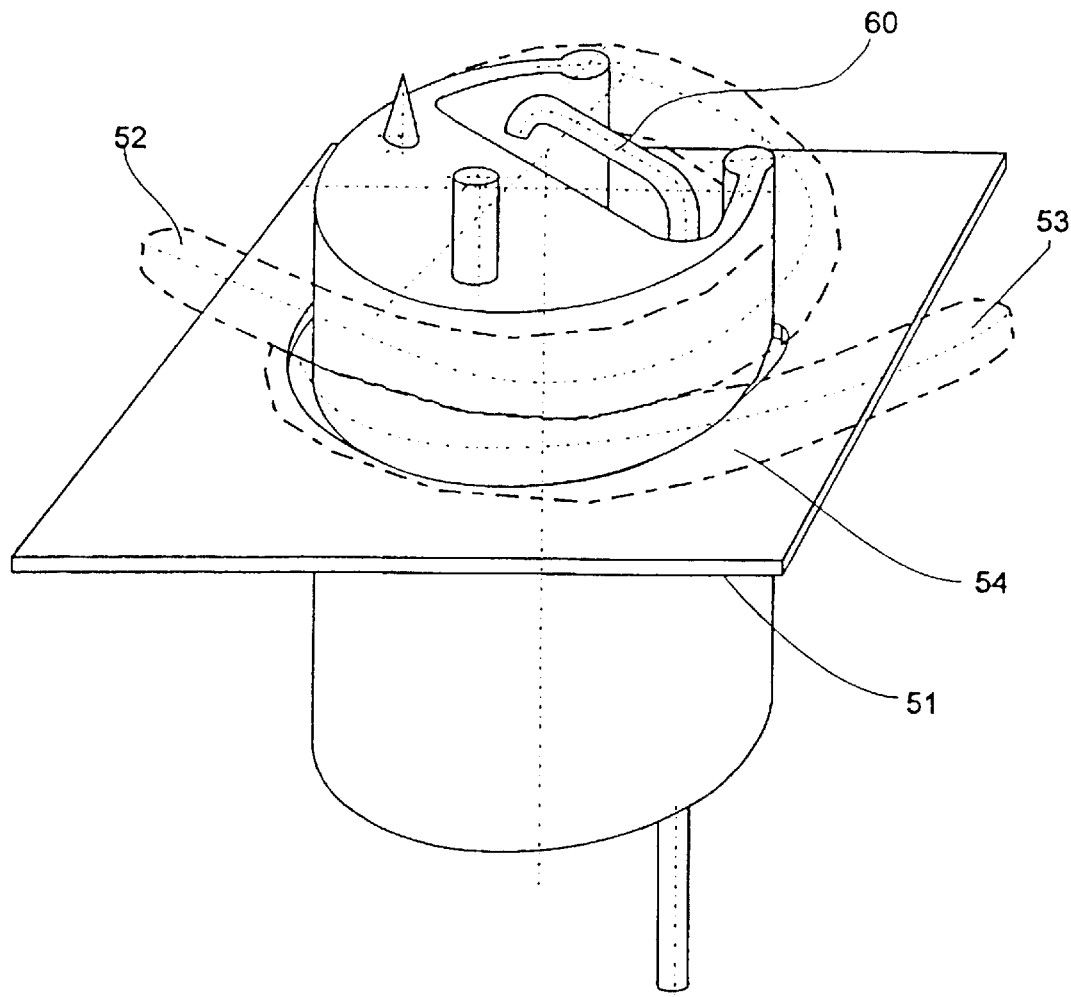

In use, dough strand 54 is loaded onto work surface 51 so that the end 52 of the strand 54 extends about two thirds of its length from the spacer element center. Strand 54 is pressed by clamp 50 against spacer element 55 (FIG. 23). End 52 of strand 54 is then grasped by the manipulator and wound in an entire loop clockwise around spacer element 55 to reach its initial position with end 52 placed over end 53 (FIG. 24).

End 53 is then grasped, lifted and wound around retractable post 66 which serves as a smaller diameter spacer element mounted on top of spacer element 55. End 53 is fixed in position by positioning on retainer pin 63, also mounted on the top of the spacer element 55 (FIG. 25).

Next, end 52 is again grasped, lifted and, by rotating tip 62, pushed under the displacer element 60 which is located in the vertical channel of spacer element 55. Displacer element 60 is then lowered to complete the knotting procedure (FIG. 26).

Finally, the spacer element 55 along with the retractable post 66 and pin 63 are completely withdrawn to positions substantially below work surface 51, leaving the plaited roll (FIG. 27) on the work surface.

Figure 28:
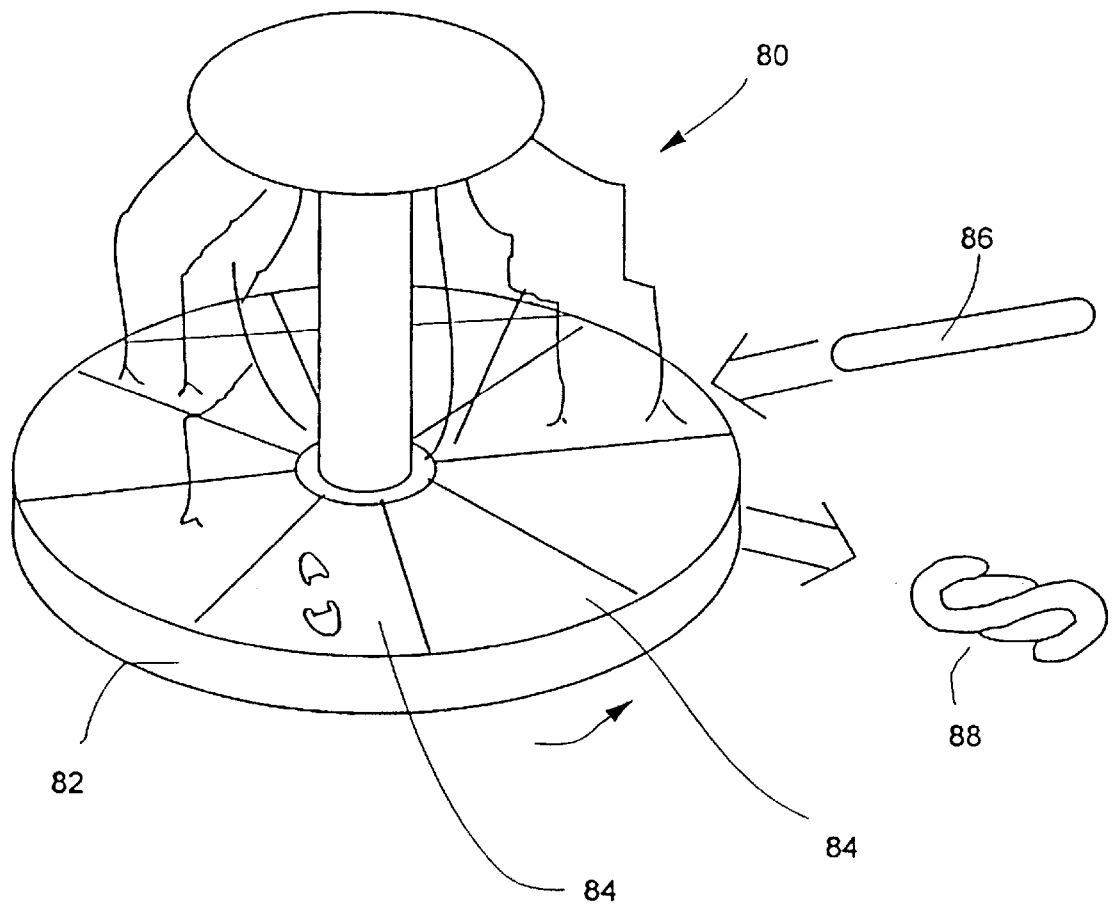
FIG. 28 is a schematic perspective view of a rotary system employing a number of devices for automated knotting of dough according to the present invention.

Turning briefly now to FIG. 28, it should be noted that a number of devices according to any of the above embodiments may be used together to construct a high output automated system 80 for forming knots in strands of dough. In a preferred implementation, system 80 features a rotating table 82 having a plurality of dough knotting stations 84, each provided with a dough processing device as described. Dough strands 86 are loaded to each passing station in turn and processed during one revolution until being unloaded as finished knotted dough shapes 88.

By way of example, if a single operation of a device takes between about 5 and about 10 seconds, use of a twelve station revolving system can raise output rates to a fraction of a second per strand.

It will be appreciated that the above descriptions are intended only to serve as examples, and that many other embodiments are possible within the spirit and the scope of the present invention.

What is claimed is:

1. A device for forming a knot in a strand of dough comprising:
   (a) a work surface for receiving the strand of dough, said work surface featuring at least one aperture;
   (b) a mechanical manipulator positioned over said work surface and configured for gripping and manipulating a first part of the strand of dough so as to form a loop of dough having a central opening associated with said aperture, said manipulator also being configured to deploy a second part of the strand in overlapping relation to said aperture; and
   (c) a displacer element aligned within said aperture and moveable in a direction substantially perpendicular to said work surface, said displacer element being configured to displace the second part of the strand through the plane of the loop of dough, thereby forming a knot.

2. The device of claim 1, further comprising a spacer element associated with said aperture, said spacer element being configured to provide an outer surface around which the loop of dough is formed, thereby delimiting said central opening.

3. The device of claim 2, wherein a vertical channel passes through said spacer element, said vertical channel being configured to accommodate the second part of the strand of dough.

4. The device of claim 3, wherein said spacer element has a lateral opening contiguous with, and extending along the length of, said vertical channel.

5. The device of claim 4, wherein said spacer element is displaceable through said aperture between a projecting position in which said spacer element projects with said outer surface disposed above said work surface, and a withdrawn position in which said spacer element lies substantially beneath said work surface to facilitate removal of the knotted dough.

6. The device of claim 5, wherein said spacer element is further displaceable to an elevated position above and removed from said work surface, thereby lifting the loop of dough away from said work surface such that the second part of the strand may be positioned in overlapping relation to said aperture below the loop of dough.

7. The device of claim 2, said aperture being referred to as a first aperture and said spacer element being referred to as a first spacer element, wherein said work surface features a second aperture displaced from said first aperture, the device further comprising a second spacer element associated with said second aperture, said second spacer element being configured to provide an outer surface around which a second loop of dough may be formed.

8. The device of claim 2, further comprising a retractable pin mounted retractably in relation to said work surface such that it assumes a projecting position in which it projects upwards above said work surface for retaining a portion of the strand of dough pierced thereby, and such that it can be retracted to a withdrawn position for releasing the portion of the strand of dough.

9. The device of claim 2, further comprising a retractable post mounted retractably in relation to said work surface such that it assumes a projecting position in which it projects above said work surface for preventing sliding of a portion of the strand of dough adjacent thereto, and such that it can be retracted to a withdrawn position for- facilitating removal of the knotted dough.

10. The device of claim 1, wherein said displacer element is formed as a hook element for drawing an end of the strand of dough through the loop of dough.

11. An automated system for forming knots in strands of dough comprising a rotating table having a plurality of dough knotting stations, each of said stations being provided with a device according to claim 1.

12. A method for automated forming of a knot in a strand of dough, the method comprising:
   (a) providing a spacer element having an outer surface and an internal channel;
   (b) forming a loop from a first part of the strand around said outer surface;
   (c) positioning a second part of the strand such that at least an end of the strand extends into said channel, crossing a virtual plane passing through the loop; and
   (d) withdrawing said spacer element from the loop of dough such that said strand remains in the form of a knot.

13. The method of claim 12, wherein said spacer element is displaceably mounted in an aperture of a work surface, said withdrawing being achieved by lowering said spacer element through said aperture to a position substantially below said work surface.

14. The method of claim 12, further comprising:
   (a) providing a second spacer element having an outer surface and an internal channel;
   (b) forming a second loop from a third part of the strand around said outer surface of said second spacer element;
   (c) positioning a fourth part of the strand such that at least an end of the strand extends into said channel, crossing a virtual plane passing through the loop; and
   (d) withdrawing said second spacer element from the second loop of dough such that said strand remains in the form of a second knot.

15. The method of claim 14, wherein said steps of positioning are a performed such that said second part of the strand is positioned to extend downwards while said fourth part of the strand is positioned to extend upwards.

16. The method of claim 15, wherein said internal channel of each of said spacer elements is a vertical channel, open so as to interrupt said outer surface and extending along the entirety of a vertical dimension of said spacer element, said spacer elements being displaceably mounted in spaced apart apertures of a work surface, the method further comprising a step of raising both of said spacer elements to facilitate positioning of said fourth part of the strand from below the loop of dough formed from said third part of the strand.

17. The method of claim 16, wherein said steps of withdrawing said spacer elements are achieved by lowering said spacer elements through said apertures to positions substantially below said work surface.

* * * * *